United States Patent
Falkowski et al.

(10) Patent No.: US 11,939,225 B2
(45) Date of Patent: Mar. 26, 2024

(54) HIGHLY SILICEOUS FORM OF ZEOLITE RHO

(71) Applicant: ExxonMobil Technology and Engineering Company, Annandale, NJ (US)

(72) Inventors: Joseph M. Falkowski, Hampton, NJ (US); Hilda Bouza Vroman, Piscataway, NJ (US); Allen W. Burton, Stewartsville, NJ (US); Eugene Terefenko, Center Valley, PA (US); Kanmi Mao, Basking Ridge, NJ (US); Karl G. Strohmaier, Port Murray, NJ (US)

(73) Assignee: ExxonMobil Technology and Engineering Company, Annandale, NJ (US)

(*) Notice: Subject to any disclaimer, the term of this patent is extended or adjusted under 35 U.S.C. 154(b) by 163 days.

(21) Appl. No.: 17/285,546

(22) PCT Filed: Nov. 1, 2019

(86) PCT No.: PCT/US2019/059486
§ 371 (c)(1),
(2) Date: Apr. 15, 2021

(87) PCT Pub. No.: WO2020/092967
PCT Pub. Date: May 7, 2020

(65) Prior Publication Data
US 2021/0380425 A1    Dec. 9, 2021

Related U.S. Application Data

(60) Provisional application No. 62/754,013, filed on Nov. 1, 2018.

(51) Int. Cl.
*B01J 20/18* (2006.01)
*B01D 53/047* (2006.01)
*C01B 39/48* (2006.01)

(52) U.S. Cl.
CPC ............ *C01B 39/48* (2013.01); *B01D 53/047* (2013.01); *B01J 20/186* (2013.01); *B01D 2253/116* (2013.01); *B01D 2253/306* (2013.01); *B01D 2253/311* (2013.01); *B01D 2256/245* (2013.01); *B01D 2257/504* (2013.01); *C01P 2002/72* (2013.01); *C01P 2002/74* (2013.01); *C01P 2006/12* (2013.01); *C01P 2006/14* (2013.01); *C01P 2006/16* (2013.01)

(58) Field of Classification Search
None
See application file for complete search history.

(56) References Cited

U.S. PATENT DOCUMENTS

| | | | | |
|---|---|---|---|---|
| 4,752,596 A | * | 6/1988 | Bergna | B01J 29/70 502/64 |
| 4,814,503 A | | 3/1989 | Abrams et al. | |
| 5,688,854 A | | 11/1997 | Fujita et al. | |
| 2016/0151772 A1 | * | 6/2016 | Chen | B01J 29/76 423/702 |

FOREIGN PATENT DOCUMENTS

| WO | 2015020014 | * | 2/2015 |
| WO | 2023089913 | * | 5/2023 |

OTHER PUBLICATIONS

Self, et al "Reversed Crystal Growth of RHO Zeolitic Imidazolate Framework". Chem. Eur. J. 21, 19090-19095 (2015). (Year: 2015).*
Liu, Xu, et al. "Hydrothermal Synthesis of Zeolite RHO . . . ". Ceramics International. 5453-5458. 2013 (Year: 2013).*
Harry E. Robson et al., "Synthesis and Crystal Structure of Zeolite Rho—A New Zeolite Related to Linde Type A", Advances in Chemistry; American Chemical Society, (1973), pp. 106-115, vol. 121.
D. R. Corbin et al., "Flexibility of the Zeolite RHO Framework. In Situ X-ray and Neutron Powder Structural Characterization of Divalent Cation-Exchanged Zeolite Rho", J. Am. Chem. Soc., (1990), pp. 4821-4830, vol. 112.
J. M. Newsam et al., "Synthesis and Structure Determination of ECT-10. A Gallosilicate Zeolite with the RHO-Framework", J. Phys. Chem., (1995), pp. 9924-9932, vol. 99.
Gillian Harvey et al., "The Synthesis of Beryllophosphate Zeolites", Stud. Surf. Sci. Catal., (1989), pp. 411-420, vol. 49.
John B. Parise et al., "Flexibility of the RHO framework: A comparison of the Rb-exchanged zeolite and the novel composition Rb24Be24As24O96 3.2 D2O", Zeolites, (1992), pp. 360-368, vol. 12.
Pingyun Feng et al., "Amine-templated syntheses and crystal structures of zeolite rho analogs", Microporous and Mesoporous Materials, (1998), pp. 315-322, vol. 23.
G. M. Johnson et al., "Synthesis and structure of a microporous aluminogermanate with the zeolite rho topology". Microporous and Mesoporous Materials, (1999), pp. 139-154, vol. 28.
Roland C. Rouse et al., "Crystal structure of pahasapaite, a beryllophosphate mineral with a distorted zeolite rho framework", American Mineralogist, (1989), pp. 1195-1202, vol. 74.

(Continued)

*Primary Examiner* — Sheng H Davis

(57) ABSTRACT

A composition can include a Rho zeolite with a RHO topology having a Si to B ratio or a Si to Al ratio greater than or equal to 8. Making such a composition can include heating an aqueous reaction mixture having a molar ratio of atomic Si to atomic B of about 4 to about 50 or a molar ratio of atomic Si to atomic Al of about 4 to about 50 in the presence of a $C_4$-$C_6$ diquat of N,2-dimethylbenzimidazole structure directing agent to a temperature of at least 75° C. to produce a Rho zeolite.

24 Claims, 9 Drawing Sheets

(56) References Cited

OTHER PUBLICATIONS

Miguel Palomino et al., "Zeolite RHO: a highly selective adsorbent for CO2/CH4 separation induced by a structural phase modification", Chem. Commun., (2012), pp. 215-217, vol. 48.
Nearchou, A. et al., "The Structure and Location of 18-Crown-6 Ether in Zeolites RHO and ZK-5", Chemistry, 2022,168-184,4.
Ke, Q., et al. (2017) "Targeted Synthesis of Ultrastable High-Silica RHO Zeolite Through Alkali Metal-Crown Ether Interaction", Chem Asian J., vol. 12, pp. 1043-1047, with Supporting Information, pp. S1-S23.

* cited by examiner

HIGHLY SILICEOUS FORM OF ZEOLITE RHO

CROSS-REFERENCE TO RELATED APPLICATIONS

This application is a national stage application, filed under 35 U.S.C. § 371, of International Patent Application No. PCT/US2019/059486, filed on Nov. 1, 2019, which claimed the benefit of U.S. Provisional Application 62/754,013, filed Nov. 1, 2018.

BACKGROUND OF THE INVENTION

Gas separation is important in various industries and can typically be accomplished by flowing a mixture of gases over an adsorbent that preferentially adsorbs a more readily adsorbed component relative to a less readily adsorbed component of the mixture. One of the more important gas separation techniques is pressure swing adsorption (PSA). PSA processes rely on the fact that under pressure gases tend to be adsorbed within the pore structure of microporous adsorbent materials or within the free volume of polymeric materials. The higher the pressure, the more gas is adsorbed. When the pressure is reduced, the adsorbed gas is released, or desorbed. PSA processes can be used to separate gases from a mixture of gases because different gases tend to fill the micropores or free volume of the adsorbent to different extents. For example, if a gas mixture such as natural gas is passed under pressure through a vessel containing polymeric or microporous adsorbent that fills with more nitrogen than it does methane, part or all of the nitrogen will stay in the sorbent bed, and the gas coming out of the vessel will be enriched in methane. When the bed reaches the end of its capacity to adsorb nitrogen, it can be regenerated by reducing the pressure, thereby releasing the adsorbed nitrogen. It is then ready for another cycle.

Another important gas separation technique is temperature swing adsorption (TSA). TSA processes also rely on the fact that under pressure gases tend to be adsorbed within the pore structure of the microporous adsorbent materials or within the free volume of a polymeric material. When the temperature of the adsorbent is increased, the gas is released, or desorbed. By cyclically swinging the temperature of adsorbent beds, TSA processes can be used to separate gases in a mixture when used with an adsorbent that selectively adsorbs one or more of the components in the gas mixture relative to another.

Adsorbents for PSA systems are usually very porous materials chosen because of their large surface area. Typical adsorbents are activated carbons, silica gels, aluminas, and zeolites. In some cases a polymeric material can be used as the adsorbent material. Though the gas adsorbed on the interior surfaces of microporous materials may consist of a layer of only one, or at most a few molecules thick, surface areas of several hundred square meters per gram enable the adsorption of a significant portion of the adsorbent's weight in gas.

Different molecules can have different affinities for adsorption into the pore structure or open volume of the adsorbent. This provides one mechanism for the adsorbent to discriminate between different gases. In addition to their affinity for different gases, zeolites and some types of activated carbons, called carbon molecular sieves, may utilize their molecular sieve characteristics to exclude or slow the diffusion of some gas molecules into their structure. This provides a mechanism for selective adsorption based on the size of the molecules and usually restricts the ability of the larger molecules to be adsorbed. Either of these mechanisms can be employed to selectively fill the micropore structure of an adsorbent with one or more species from a multi-component gas mixture.

Zeolite Rho was reported in 1973 by Robson et al. of Exxon (Adv. Chem. Ser., 121, 106-115 (1973)). The zeolite was prepared from aluminosilicate gels containing a mixture of sodium and cesium cations. The product possessed Si/Al atomic ratio of 3 and a Na/Cs ratio of about 3. The as-made form has a cubic, body-centered cubic unit cell with a=15.02 Å. Upon drying at 120° C., the unit cell was reported to shrink to 14.6 Å. The calcined H+ form of the zeolite has a cubic unit cell dimension of about 15.0 Å. The topological framework (RHO) is composed of Linde type A (LTA) cages that are linked to adjacent LTA cages through the 8-rings to create double 8-rings (D8R). In contrast, the LTA framework is composed of sodalite cages that link to other sodalite cages through 4-rings to create double 4-rings and a larger LTA cage.

Although the framework density of LTA (12.9 T atom/nm$^3$) is lower than that of RHO (14.1 T atom/nm3), the hypothetical accessible micropore volume of an all-silica RHO is greater than that of all-silica LTA because the space within the sodalite cages is not accessible to nitrogen under typical conditions of nitrogen physisorption used to determine microporosity. In contrast, the space within the LTA and D8R cages of RHO is available to small adsorbate molecules such as nitrogen. McCusker and Baerlocher (Proceedings of the 6th International Zeolite Conference, 812-821, 1984, Butterworth and Co) performed Rietveld refinements of powder X-ray diffraction data that show the dramatic effects of dehydration/hydration on the structure. Upon heating to 100° C., the symmetry changes from Im3m to I4bar3m and the 8-rings become elliptical in shape. The 8-ring window size shrinks from 3.6 to 2.3 Å. The degree of distortion in the 8-rings depends strongly on the nature of the exchanged cations (Corbin et al. J. Am. Chem. Soc., 1990, 112 (12), pp 4821-4830).

Later Chatelain et al. (Microporous Materials) reported a "high-silica" Rho with Si/Al ~4.5. Again, the zeolite was prepared using a mixture of sodium and cesium ions, but 18-crown-6 was added to the synthesis mixture. About 1 crown ether molecule is occluded per unit cell. Presumably, the occlusion of 18-crown-6 within the pores of the zeolite decreases the density of occluded cations because of the space it consumes. This may explain why the product requires less framework aluminum. From n-hexane adsorption, they determined a micropore volume of 0.26 cc/g. In contrast, Flank reported that conventional zeolite Rho, in the ammonium exchanged form heated above 673K, has only 0.16 cc/g micropore volume as determined from n-butane adsorption (ACS Symposium Series, Vol. 40, 43-52).

Newsam et al. (J. Phys. Chem., 99, 9924-9932 (1995)) reported the synthesis and structure of ECR-10, a gallosilicate (Si/Ga=1.4) zeolite with the RHO topology. Like the aluminosilicate materials, the zeolite is prepared in the presence of both cesium and sodium; the final product has Na/Cs atomic ratio of 1.29. The unit cell parameters of the hydrated and dehydrated materials are about 14.9 and 14.5 Å, respectively.

Other RHO zeotypes have been prepared as beryllophosphates (Stud. Surf. Sci. Catal., 49, 411-420 (1989)), beryl-loarsenates (Zeolites, 12, 360-368 (1992)), metal alumino-phosphates (Microporous Mesoporous Mat., 23, 315-322 (1998) and Microporous Mesoporous Mat., 23, 315-322 (1998) and Microporous Mesoporous Mat., 23, 315-322

(1998)), and aluminogermanates (Microporous Mesoporous Mat., 28, 139-154 (1999)). Pahasapaite is a naturally occurring beryllophosphate RHO material (Am. Mineral., 74, 1195-1202 (1989)). However, these materials generally suffer from pore thermal and/or hydrothermal stability.

Palomino et al. (Chem. Commun., 2012, 48, 215-217) reported that zeolite Rho successfully separates $CO_2$ from $CH_4$ with the highest selectivity among known zeolites. They attribute the high selectivity and high $CO_2$ adsorption capacity of zeolite Rho to a combination of the pore aperture and the expansion of the void volume upon phase transition. At low pressure the elliptical pores do not allow passage of methane but it does allow adsorption of $CO_2$. As the zeolite adsorbs more $CO_2$ at higher pressures, the zeolite undergoes a phase transition from I4bar3m to Im3m and the windows become circular and larger. At this point, methane can begin to adsorb, but most of the void volume is occupied by carbon dioxide. The phase change is akin to what occurs when water is adsorbed into the dehydrated structure.

To this point there have been no reports of highly siliceous forms of zeolite Rho.

SUMMARY OF THE INVENTION

This invention includes compositions, systems, and methods relating thereto to a highly siliceous form of zeolite Rho.

A first example embodiment of the present invention is a composition comprising: Rho zeolite with a RHO topology having a Si to B ratio or a Si to Al ratio greater than or equal to 8.

Another example embodiment is a process for separation of carbon dioxide from a mixture comprising carbon dioxide and one or more of an alkane, oxygen, nitrogen, $H_2S$, $SO_x$, and $NO_x$, the process comprising contacting the mixture with the composition of the first example embodiment.

Yet another example embodiment is a process for separation of carbon dioxide from a mixture comprising carbon dioxide and methane, the process contacting the mixture with the composition of the first example embodiment.

Another example embodiment is a contacting a gas stream comprising $NO_x$ and the composition of the first example embodiment.

Yet another example embodiment is a process comprising synthesizing a methylamine from methanol and/or dimethylether and ammonia using the composition of the first example embodiment.

Another example embodiment is a method comprising: heating an aqueous reaction mixture having a molar ratio of atomic Si to atomic B of about 4 to about 50 or a molar ratio of atomic Si to atomic Al of about 4 to about 50 in the presence of a $C_4$-$C_6$ diquat of N,2-dimethylbenzimidazole structure directing agent to a temperature of at least 75° C. to produce a Rho zeolite.

DETAILED DESCRIPTION

Figure 1:
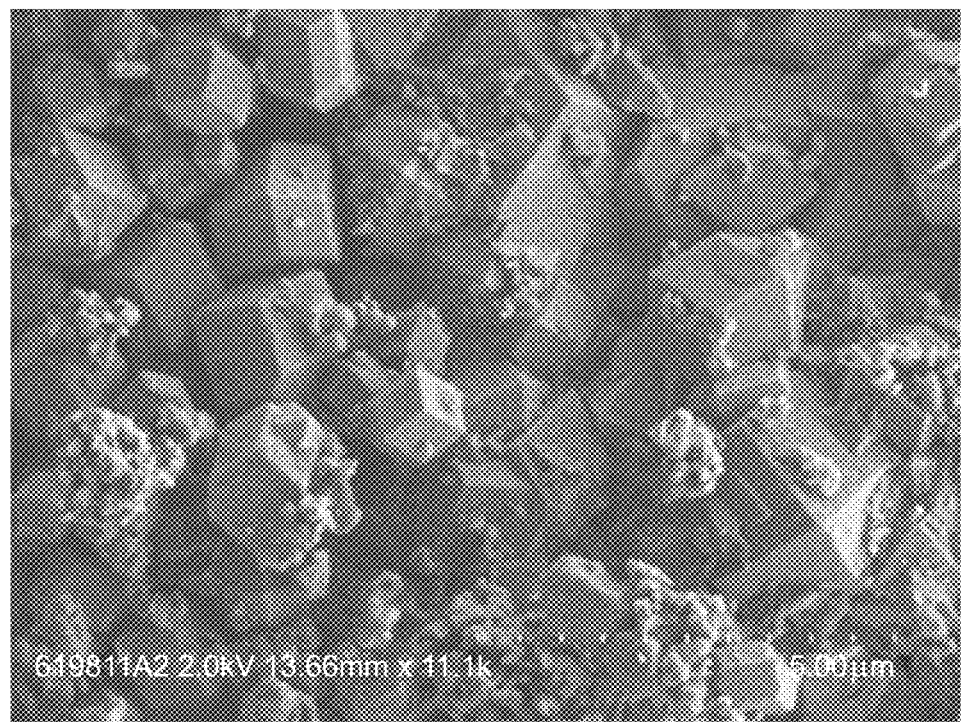
FIG. 1 is a scanning electron microscopy (SEM) micrograph of a borosilicate Rho zeolite of the present invention.
Figure 2A:
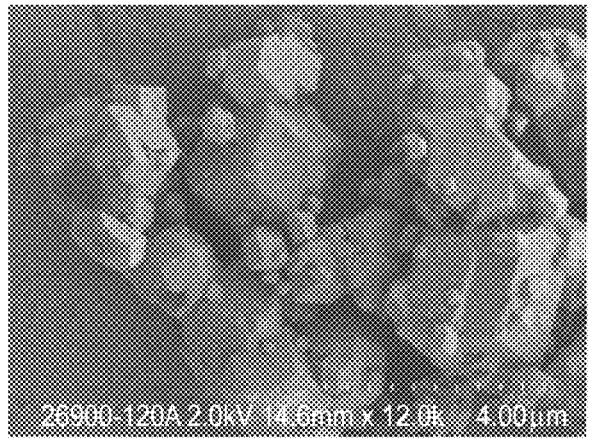
FIGS. 2A-2D are SEM micrographs of a borosilicate Rho zeolite of the present invention.
Figure 2B:
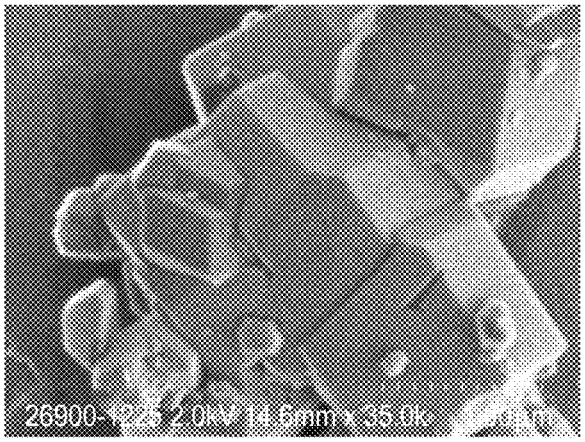
Figure 2C:
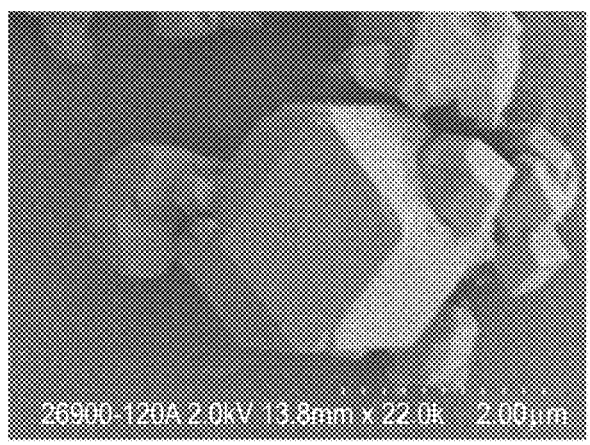
Figure 2D:
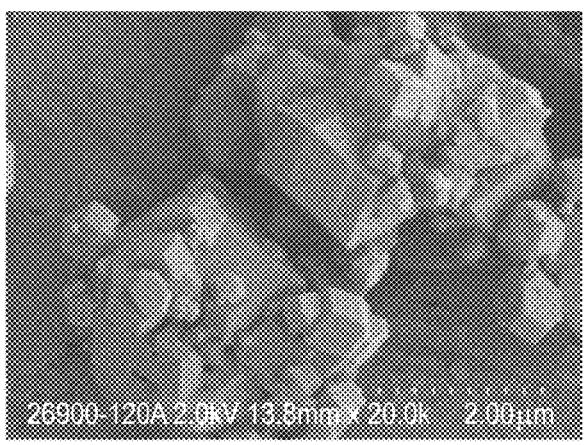

The present invention includes compositions, systems, and methods relating thereto to a highly siliceous form of zeolite Rho. More specifically, the zeolite is a borosilicate zeolite or an aluminosilicate zeolite having a RHO topographical framework. Unless otherwise specified, the term "aluminosilicate/borosilicate Rho zeolite" refers to either a borosilicate zeolite or an aluminosilicate zeolite of the present invention. A RHO topographical framework is composed of Linde type A (LTA) cages linked to adjacent LTA cages through the 8-rings to create double 8-rings. The borosilicate Rho zeolite preferably has a Si to B or a Si to Al ratio greater than or equal to about 8.

A silica source and a boron or aluminum source can be combined in the presence of a $C_4$-$C_6$ diquat of N,2-dimethylbenzimidazole (see Compounds I, II, and III described further herein) to form a reaction mixture that is then heated to produce the borosilicate Rho zeolite.

Examples of silica sources include, but are not limited to, a colloidal suspensions of silica, a precipitated silica alkali metal silicate, tetraalkyl orthosilicate, and any combination thereof.

Examples of boron sources include, but are not limited to, boric acid, a water-soluble boric acid salt, and any combination thereof.

Examples of aluminum sources include, but are not limited to, aluminum nitrate, aluminum sulfate, sodium aluminate, aluminum oxide, alumina sol, alumina trihydrate, and any combination thereof.

The molar ratio of atomic Si to atomic B in the reaction mixture can range from about 4 to about 50, preferably about 4 to about 30, and more preferably about 4 to about 20. The molar ratio of atomic Si to atomic Al in the reaction mixture can range from about 8 to about 40, preferably about 8 to about 30, and more preferably about 10 to about 20.

Examples of $C_4$-$C_6$ N,2-dimethylbenzimidazoles (generally referred to herein as structure directing agents "SDA") include, but are not limited to, Compound I, Compound II, and Compound III, where $X^-$ can be $OH^-$, $F^-$, $Cl^-$, $Br^-$, or $I^-$.

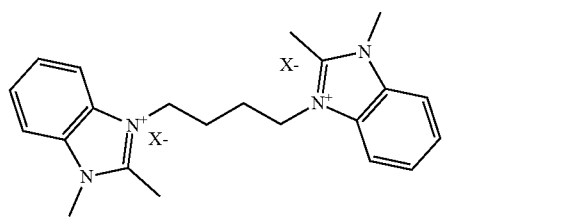

Compound I

-continued

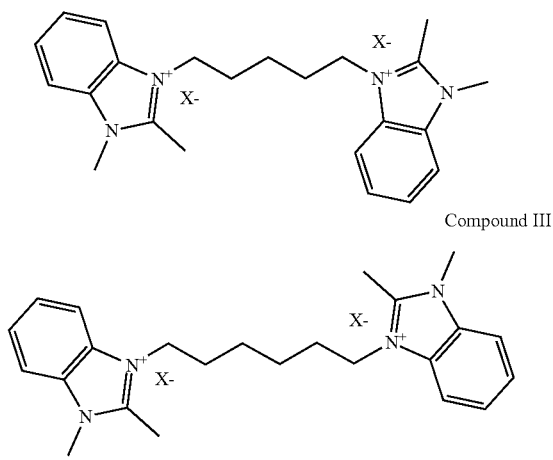

Compound II

Compound III

The molar ratio of atomic Si to SDA in the reaction mixture can range from about 1 to about 15, preferably about 2 to about 10, and more preferably about 3 to about 7.

In some instances, the reaction mixture may be seeded with small amount aluminosilicate/borosilicate Rho zeolite. The amount of seeds in the reaction mixture can be about 0.1 wt % to about 10 wt % based on the weight of the silica (SiO$_2$) in the reaction mixture, preferably about 0.5 wt % to about 7 wt %, and more preferably about 1 wt % to about 5 wt %.

The molar ratio of water to atomic Si in the reaction mixture can range from about 2 to about 80, preferably about 5 to about 30, and more preferably about 10 to about 30.

The aluminosilicate/borosilicate Rho zeolite syntheses can be conducted at a temperature of at least about 75° C. to produce an aluminosilicate/borosilicate Rho zeolite, preferably about 75° C. to about 200° C., more preferably about 100° C. to about 185° C., and more preferably about 150° C. to about 175° C.

The aluminosilicate/borosilicate Rho zeolite syntheses can be conducted for a time of at least about 2 hours of to produce an aluminosilicate/borosilicate Rho zeolite, preferably about 34 hours to about 20 days, more preferably about 72 hours to about 15 days, and more preferably about 4 days to about 10 days.

The time and temperature of the reaction are interrelated. Typically, lower temperatures require longer reaction times. Further, if a seed is included, then the reaction time, even at lower reaction temperatures, may be reduced.

The produced aluminosilicate/borosilicate Rho zeolite of the invention preferably has a significantly higher concentration of Si than B. As produced from the reaction mixture, the borosilicate Rho zeolite may have a molar ratio of atomic Si to atomic B greater than or equal to about 8, preferably about 9 to about 16, and more preferably about 10 to about 13. As produced from the reaction mixture, the aluminosilicate Rho zeolite may have a molar ratio of atomic Si to atomic Al greater than or equal to about 8, preferably about 9 to about 16, and more preferably about 10 to about 13.

In some instances, the at least a portion of the boron in the borosilicate Rho zeolite can be released or removed from the structure to further increase the Si to B ratio in the borosilicate Rho zeolite. This can be achieved by treating the borosilicate Rho zeolite with an acid and/or boiling in hot water.

In some instances, the at least a portion of the aluminum in the aluminosilicate Rho zeolite can be released or removed from the structure to further increase the Si to Al ratio in the aluminosilicate Rho zeolite. This can be achieved by treating the borosilicate Rho zeolite with an acid.

Examples of acids suitable for treating the aluminosilicate/borosilicate Rho zeolite include, but are not limited to, sulfuric acid, hydrochloric acid, acetic acid, nitric acid, and any combination thereof.

The borosilicate Rho zeolite of the present invention having been treated to release or remove boron can have a molar ratio of atomic Si to atomic B greater than or equal to about 11. Because almost all of the B can be removed, a molar ratio of atomic Si to atomic B can be infinitely high. The borosilicate Rho zeolite of the present invention having been treated to release or remove boron can comprise boron at less than 5 wt % of the borosilicate Rho zeolite, or less than 1 wt % of the borosilicate Rho zeolite, or less than 0.1 wt % of the borosilicate Rho zeolite, or less than 0.01 wt % of the borosilicate Rho zeolite.

The aluminosilicate Rho zeolite of the present invention having been treated to release or remove aluminum can have a molar ratio of atomic Si to atomic Al greater than or equal to about 8. Because almost all of the Al can be removed, a molar ratio of atomic Si to atomic Al can be infinitely high. The aluminosilicate Rho zeolite of the present invention having been treated to release or remove aluminum can comprise aluminum at less than 10 wt % of the aluminosilicate Rho zeolite, less than 5 wt % of the aluminosilicate Rho zeolite, or less than 1 wt % of the aluminosilicate Rho zeolite, or less than 0.1 wt % of the aluminosilicate Rho zeolite, or less than 0.01 wt % of the aluminosilicate Rho zeolite.

The aluminosilicate/borosilicate Rho zeolite (treated after synthesis or as-produced) can be calcined at temperature of about at about 500° C. to about 900° C., 550° C. to about 850° C., and more preferably 600° C. to about 800° C.

The aluminosilicate/borosilicate Rho zeolite (treated after synthesis or as-produced) can have an average diameter of about 0.1 microns to about 25 microns, preferably about 1 micron to about 15 microns, and more preferably about 3 microns to about 10 microns. Particle size can be determined by imaging the crystals with scanning electron microscopy and averaging the diameter of at least 100 crystals. The crystals have a facetted shape. Therefore, the diameter is defined as the largest distance passing from one side to the other through the center of the crystal.

The aluminosilicate/borosilicate Rho zeolite (treated after synthesis or as-produced) can have surface area of about 800 m$^2$/g to about 1250 m$^2$/g, preferably about 900 m$^2$/g to about 1200 m$^2$/g, and more preferably about 950 m$^2$/g to about 1100 m$^2$/g. Surface area is determined using Brunauer, Emmett and Teller (BET) analysis with nitrogen adsorption (ASTM D4365-13).

The aluminosilicate/borosilicate Rho zeolite (treated after synthesis or as-produced) can have micropore volume of about 0.25 cm$^3$/g to about 0.50 cm$^3$/g, preferably about 0.30 cm$^3$/g to about 0.45 cm$^3$/g, and more preferably about 0.35 cm$^3$/g to about 0.40 cm$^3$/g. Surface area is determined via nitrogen adsorption by ASTM D4365-13.

The as-synthesized and treated (e.g., calcined or acid treated) borosilicate Rho zeolite can have characteristic X-ray diffraction (XRD) patterns, the essential (most intense) reflection lines of which may be represented in Table 1 (as synthesized form) and Table 2 (calcined form). Variations can occur as a function of the specific composition and SDA used in synthesis. For this reason, the relative intensities and d-spacings ("d(Å)") are represented as ranges in Tables 1 and 2.

TABLE 1

| d(Å) | Relative Intensity |
|---|---|
| 10.4-10.2 | 25-35 |
| 6.1-5.9 | 80-100 |
| 5.3-5.1 | 25-35 |
| 4.0-3.8 | 25-35 |
| 3.55-3.35 | 30-40 |
| 3.34-3.24 | 25-35 |
| 2.95-2.8 | 15-25 |
| 2.75-2.6 | 15-25 |

TABLE 2

| d(Å) | Relative Intensity |
|---|---|
| 10.4-10.2 | 80-100 |
| 7.4-7.2 | 10-20 |
| 6.1-5.9 | 40-60 |
| 4.7-4.4 | 5-15 |
| 3.6-3.4 | 10-20 |
| 3.35-3.2 | 10-20 |

The as-synthesized and treated (e.g., calcined or acid treated) aluminosilicate Rho zeolite can have characteristic X-ray diffraction (XRD) patterns, the essential (most intense) reflection lines of which may be represented in Table 3 (as synthesized form) and Table 4 (calcined form). Variations can occur as a function of the specific composition and SDA used in synthesis. For this reason, the relative intensities and d-spacings ("d(Å)") are represented as ranges in Tables 3 and 4.

TABLE 3

| d(Å) | Relative Intensity |
|---|---|
| 10.8-10.5 | 25-35 |
| 6.2-6.0 | 80-100 |
| 5.4-5.2 | 25-35 |
| 4.1-3.9 | 25-35 |
| 3.55-3.45 | 30-40 |
| 3.36-3.32 | 25-35 |
| 3.08-3.00 | 15-25 |
| 2.74-2.70 | 15-25 |

TABLE 4

| d(Å) | Relative Intensity |
|---|---|
| 10.6-10.4 | 80-100 |
| 7.3-7.5 | 10-30 |
| 6.15-6.05 | 80-100 |
| 4.8-4.6 | 10-25 |
| 3.6-3.4 | 20-50 |
| 3.37-3.27 | 30-50 |

Applications

The aluminosilicate/borosilicate Rho zeolites (treated after synthesis or as-produced) of the present invention can be used as a sorbent, for example, in the separation of carbon dioxide from a mixture comprising carbon dioxide and one or more alkanes (e.g., methane, ethane, propane, and/or butane) and/or a mixture comprising carbon dioxide and oxygen, nitrogen, $H_2S$, $SO_x$, and/or $NO_x$. The separation process can employ the equilibrium selectivity of the aluminosilicate/borosilicate Rho zeolites, the kinetic selectivity of the aluminosilicate/borosilicate Rho zeolites, or both the equilibrium and kinetic selectivity of the aluminosilicate/borosilicate Rho zeolites, for carbon dioxide over the other component(s) of the mixture. In particular, aluminosilicate/borosilicate Rho zeolites having an atomic Si to atomic B molar ratio from about 8 to about 30 can typically possess a sorption capacity for $CO_2$ at about 1 atm (about 100 kPa) from about 0.8 mmol/g to about 2.0 mmol/g. Alternatively or in addition, the aluminosilicate/borosilicate Rho zeolites can be used as a catalyst to facilitate one or more organic compound conversion processes including many of present commercial/industrial importance.

The aluminosilicate/borosilicate Rho zeolites (treated after synthesis or as-produced) of the present invention can be used as a support in a catalyst system. Such catalysts may, for example, be useful in reducing $NO_x$ in a gas stream (e.g., an exhaust stream from a combustion operation). For reducing $NO_x$, copper is a preferred transition metal that the aluminosilicate/borosilicate Rho zeolites can be impregnated with to produce the catalyst. Other potential metals include zinc, vanadium, chromium, manganese, iron, cobalt, nickel, rhodium, palladium, platinum, and molybdenum. In addition to the transition metal, alkali or alkaline earth metals may be present in the catalyst to facilitate $NO_x$ reduction. Such metals include alkaline earth metals, sodium, potassium, rubidium, cesium, magnesium, calcium and barium. Furthermore, a steam stabilizing amount of titanium, zirconium, or rare earth can be included. The metal can be impregnated into the aluminosilicate/borosilicate Rho zeolites as a metal or an ion. The metal can be about 1 wt % to about 10 wt % of the catalyst system (e.g., impregnated aluminosilicate/borosilicate Rho zeolites), preferably about 2 wt % to about 5 wt %.

In an example embodiment for making the catalyst, a steam stabilizing amount of titanium or zirconium cations or a mixture of these metal compounds is included in the additive by treatment of aluminosilicate/borosilicate Rho zeolites (treated after synthesis or as-produced) with any titanium or zirconium compound that can be brought into intimate association with the aluminosilicate/borosilicate Rho zeolites (e.g., aqueous solutions of titanium tetramethoxide and zirconium acetate). The introduction of titanium or zirconium may follow ion-exchange by copper ions. Alternatively, impregnation with copper ions also may be done concurrently therewith with an aqueous solution containing, for example, both divalent copper cations and a soluble titanium or soluble zirconium compound. Additional synthesis and catalyst system preparation details can be found in U.S. Pat. No. 6,143,261, which is incorporated herein by reference.

In another example, the aluminosilicate/borosilicate Rho zeolite can be used as a catalyst in the synthesis of methylamines (e.g., monomethylamine, dimethylamine, and trimethylamine) from methanol (and/or dimethylether) and ammonia. The reactants (methanol (and/or dimethylether) and ammonia) can be in concentrations to provide for a carbon to nitrogen molar ratio of about 0.2 to about 1.5, preferably about 0.7 to about 1.3. The reaction temperature is about 250° C. to about 450° C., preferably about 300° C. to about 425° C. Additional synthesis details can be found in U.S. Pat. No. 5,569,785, which is incorporated herein by reference.

As in the case of many catalysts used in organic compound (hydrocarbon) conversion processes, it may be desirable to incorporate the aluminosilicate/borosilicate Rho zeolites with another material resistant to the temperatures and other conditions employed in organic conversion processes. Such materials can include active and inactive materials and synthetic or naturally occurring zeolites, as well as inorganic materials such as clays, silica, and/or metal oxides such as alumina. The latter may be either naturally occurring or in the form of gelatinous precipitates or gels, including mixtures of silica and metal oxides. Use of a material in conjunction with the aluminosilicate/borosilicate Rho zeolites (i.e., combined therewith and/or present during synthesis of the new crystal, which is active) can tend to change the conversion and/or selectivity of the catalyst in certain organic conversion processes. Inactive materials can suitably serve as diluents to control the amount of conversion in a given process so that products can be obtained in an economic and orderly manner without employing other (more costly) means for controlling the rate of reaction. These materials may be incorporated into naturally occurring clays (e.g., bentonite and kaolin) to improve the crush strength of the catalyst under commercial operating conditions. Said materials (i.e., clays, oxides, etc.) can function as binders for the catalyst. It can be desirable to provide a catalyst having good crush strength, because in commercial use it can be desirable to prevent the catalyst from breaking down into powder-like materials (attrition). These clay and/or oxide binders have been employed normally only for the purpose of improving the crush strength of the catalyst.

Naturally occurring clays which can be composited with the aluminosilicate/borosilicate Rho zeolites can include, without limitation, the montmorillonite and kaolin family, which families include the subbentonites, and the kaolins commonly known as Dixie, McNamee, Georgia, and Florida clays, or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with the aluminosilicate/borosilicate Rho zeolites can additionally or alternatively include inorganic oxides, such as silica, zirconia, titania, magnesia, beryllia, alumina, and mixtures thereof.

Alternatively or in addition to the foregoing materials, the aluminosilicate/borosilicate aluminosilicate/borosilicate Rho zeolites can be composited with a porous matrix material such as silica-alumina, silica-magnesia, silica-zirconia, silica-thoria, silica-beryllia, silica-titania, and/or one or more ternary compositions such as silica-alumina-thoria, silica-alumina-zirconia silica-alumina-magnesia, and silica-magnesia-zirconia.

The relative proportions of aluminosilicate/borosilicate Rho zeolites and inorganic oxide matrix may vary widely, with the aluminosilicate/borosilicate Rho zeolite content ranging from about 1 wt % to about 90 wt %, and, more usually, particularly when the composite is prepared in the form of beads, in the range of about 2 wt % to about 80 wt % of the composite. An exemplary matrix content range can include from about 10 wt % to about 50 wt %.

Numerical ranges used herein include the numbers recited in the range. For example, the numerical range "from 1 wt % to 10 wt %" includes 1 wt % and 10 wt % within the recited range.

EXAMPLE EMBODIMENTS

A first example embodiment of the present invention is a composition comprising: Rho zeolite with a RHO topology having a Si to B ratio or a Si to Al ratio greater than or equal to 8. This example embodiment can include one or more of the following: Element 1: wherein the Rho zeolite has a BET surface area about 800 $m^2/g$ to about 1250 $m^2/g$; Element 2: wherein the Rho zeolite has micropore volume of about 0.25 $cm^3/g$ to about 0.50 $cm^3/g$; Element 3: wherein the Rho zeolite has an average diameter of about 0.1 microns to about 25 microns; Element 4: in an as-synthesized form of a borosilicate Rho zeolite, an X-ray diffraction pattern including the d(Å) and relative intensities of Table 1; Element 5: wherein in a calcined or acid treated form of a borosilicate Rho zeolite, an X-ray diffraction pattern including the d-spacings d(Å) and relative intensities of Table 2; Element 6: wherein in an as-synthesized form of an aluminosilicate Rho zeolite, an X-ray diffraction pattern including the d-spacings d(Å) and relative intensities of Table 3; and Element 7: wherein in a calcined or acid treated form of an aluminosilicate Rho zeolite, an X-ray diffraction pattern including the d(Å) and relative intensities of Table 4. Example combinations include, but are not limited to, two or more of Elements 1-3; one of Elements 4-7 in combination with one or more of Elements 1-3; Elements 4 and 5 in combination and optionally in further combination with one or more of Elements 1-3; and Elements 6 and 7 in combination and optionally in further combination with one or more of Elements 1-3.

Another example embodiment is a process for separation of carbon dioxide from a mixture comprising carbon dioxide and one or more of an alkane, oxygen, nitrogen, $H_2S$, $SO_x$, and $NO_x$, the process comprising contacting the mixture with the composition of the first example embodiment optionally including one or more of Elements 1-7.

Yet another example embodiment is a process for separation of carbon dioxide from a mixture comprising carbon dioxide and methane, the process contacting the mixture with the composition of the first example embodiment optionally including one or more of Elements 1-7.

Another example embodiment is a contacting gas stream comprising NO and the composition of the first example embodiment optionally including one or more of Elements 1-7.

Yet another example embodiment is a process comprising synthesizing a methylamine from methanol and/or dimethylether and ammonia using the composition of the first example embodiment optionally including one or more of Elements 1-7.

Another example embodiment is a method comprising: heating an aqueous reaction mixture having a molar ratio of atomic Si to atomic B of about 4 to about 50 or a molar ratio of atomic Si to atomic Al of about 4 to about 50 in the presence of a structure directing agent selected from Compound I, Compound II, Compound III, or a mixture of two or more of Compounds I, II, and III to a temperature of at least 75° C. to produce a Rho zeolite. Optionally, this example embodiment can include one or more of the following: Element 8: wherein the aqueous reaction mixture has a molar ratio of atomic Si to the structure directing agent of about 1 to about 15; Element 9: wherein the aqueous reaction mixture has a molar ratio of water to atomic Si of about 2 to about 50; Element 10: wherein a Si source in the aqueous reaction mixture is selected from the group consisting of: a colloidal suspensions of silica, a precipitated silica alkali metal silicate, tetraalkyl orthosilicate, a different high silica zeolite (dealuminated zeolite y \Y, or another borosilicate zeolite (boron beta zeolite can be both boron and silica source) and any combination thereof; Element 11: wherein the temperature is about 75° C. to about 200° C.; Element 12: wherein heating occurs for 2 hours to 20 days; Element 13: wherein the aqueous reaction mixture further comprises Rho zeolite seeds; Element 14: wherein a B source in the aqueous reaction mixture is selected from the group consisting of: boric acid, a water-soluble boric acid salt, and any combination thereof; Element 15: wherein an Al source in the aqueous reaction mixture is selected from the group consisting of: aluminum nitrate, aluminum sulfate, sodium aluminate, aluminum oxide, alumina sol, alumina trihydrate, and any combination thereof; Element 16: wherein, in an as-synthesized form, a borosilicate Rho zeolite has an X-ray diffraction pattern including the d(Å) and relative intensities of Table 1; Element 17: wherein, in an as-synthesized form, an aluminosilicate Rho zeolite has an X-ray diffraction pattern including the d(Å) and relative intensities of Table 3; Element 18: the method further comprising: calcining the Rho zeolite at 500° C. to 800° C. to produce a calcined Rho zeolite; Element 19: Element 18 and wherein a calcined borosilicate Rho zeolite has an X-ray diffraction pattern including the d(Å) and relative intensities of Table 2; Element 20: Element 18 wherein a calcined aluminosilicate Rho zeolite has an X-ray diffraction pattern including the d(Å) and relative intensities of Table 4; and Element 18: the method further comprising: exposing the Rho zeolite to an acid. Example combinations include, but are not limited to, two or more of Elements 8-13 in combination; Elements 16, 18, and 19 in combination optionally in further combination with one or more of Elements 8-14; Elements 17, 18, and 20 in combination optionally in further combination with one or more of Elements 8-13 and 15; and Element 21 in combination with one or more of Elements 8-20.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1. Reaction Scheme 1 illustrates the synthesis of Compound II. 200 mL of anhydrous THF was cannulated into a 500 mL flame dried round bottom with a stir bar. 3.965 g (30.0 mmol) of 2-methylbenzimidazole was added to the flask, then the flask was purged with nitrogen. Reaction mixture was cooled to −78 degrees Celsius. 12.0 mL (30.0 mmol, 1.0 eq) of 2.5M N-butyllithium added to the reaction mixture and stirred at −78 degrees Celsius for 5 minutes before returning to room temperature and stirring for 15 minutes at room temperature. 12.77 g (90.0 mmol, 3.0 eq) of iodomethane added and reaction stirred at room temperature for 16 hours. The light brown reaction mixture was poured into 150 mL of DI water and extracted 2× with 75 mL ethyl acetate and 2× with 75 mL methylene chloride. Combined organic layers were dried with sodium sulfate, gravity filtered into a pre-weighed round bottom, and solvent was removed by vacuum to yield product as a beige solid (3.04 g, 69.3% yield). 7.52 g (51.2 mmol, 2.05 eq) of the product from the previous reaction was placed into a 500 mL round bottom flask with a stir bar and dissolved in 100 mL of acetonitrile. 5.74 g of 1,5-dibromopentane (24.97 mmol, 1.0 eq) was added to the flask and reaction was refluxed under nitrogen for 72 hours. White solid was observed to be crashed out in the reaction mixture. The precipitate was filtered on a medium frit and washed 3× with 50 mL of acetone. Solid placed in an evaporating dish and dried overnight in the vacuum oven. Resulting white powder product (10.15 g, 78.0% yield).

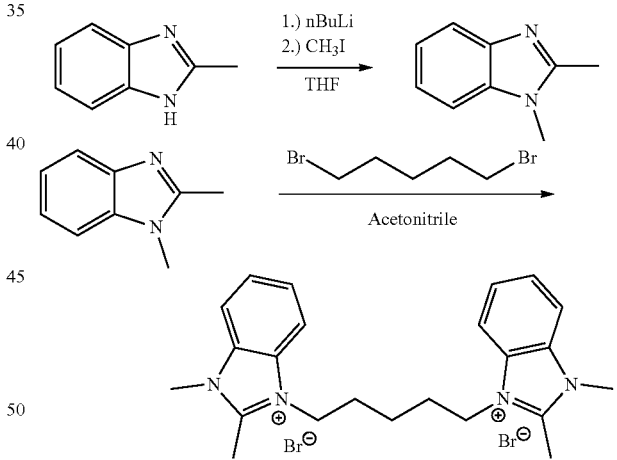

Reaction Scheme 1

Synthesis of Compounds I and III can be performed similarly. For example, to produce the Compound I, 1 molar equivalent of 1,4-dibromobutane was substituted for the 1,5-dibromopentane.

Example 2. In a 1.5 mL reactor, boric acid, tetramethylorthosilicate (TMOS), and a hydroxide solution of Compound II were combined with a sufficient amount of water so that in the reaction mixture the molar ratio of atomic Si to atomic B was 10, and the molar ratio of atomic Si to the SDA was 4. The mixture was then freeze-dried to remove ethanol and much of the water, and the molar ratio of water to atomic Si was then adjusted to 4 by back addition of deionized water. The reaction mixture was heated at 150° C. for 10 days to produce a mixture of the borosilicate Rho zeolite and amorphous material. FIG. 1 is a scanning electron microscopy (SEM) micrograph of the product.

Example 3. The reaction mixture of Example 2 was heated for a total of 28 days at 150° C. to produce a substantially pure borosilicate Rho zeolite (less than 2 wt % amorphous product).

Example 4. The conditions of Example 2 were reproduced in a Steel Parr reactor with a 10-mL Teflon insert with the addition of seeds from the Example 3 product. The seeds increased the speed of the reaction such that within 11 days, a substantially pure borosilicate Rho zeolite was produced. FIGS. 2A-2D are SEM micrographs of the product.

The Example 4 product was calcined to produce a white, calcined borosilicate Rho zeolite. Calcination was performed in a box furnace in a staged procedure. The sample was exposed to flowing nitrogen for two hours at room temperature, followed by a ramp from room temperature to 400° C. over a two-hour period while remaining under nitrogen flow. The temperature then remained at 400° C. for 15 minutes and then the atmosphere was switched from flowing nitrogen to flowing dried air. The temperature was then ramped from 400° C. to 600° C. over a 1-hour period. The temperature remained at 600° C. for 16 hours and then the box furnace was allowed to cool.

Figure 3:
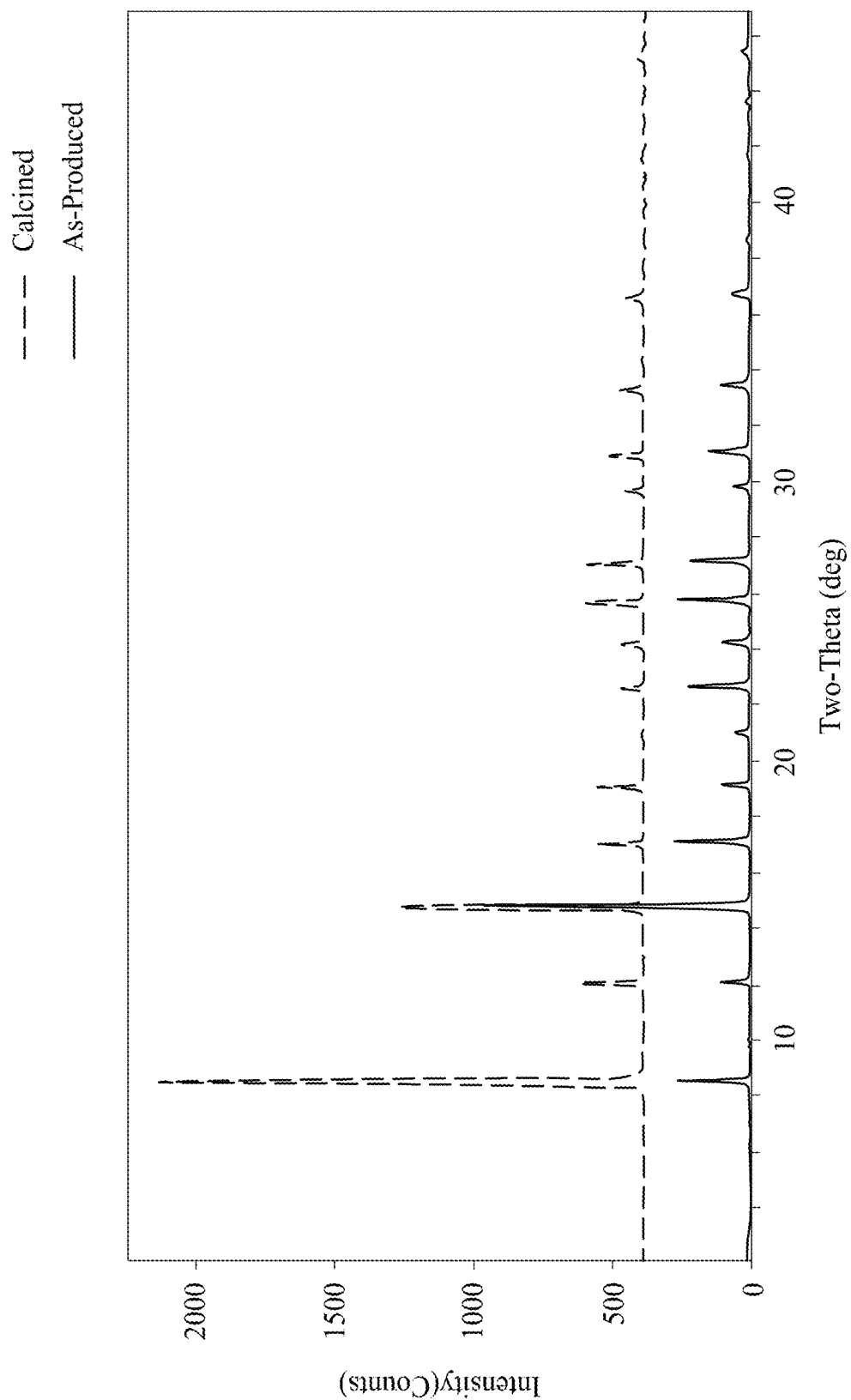
FIG. 3 is a plot of the x-ray diffraction patterns of the as-produced borosilicate Rho zeolite and the calcined borosilicate Rho zeolite.

Calcination removes the SDA from the borosilicate Rho zeolite. FIG. 3 and Tables 6 and 6 are the XRD patterns (Bruker DaVinci D8 Discovery instrument in continuous mode using a Cu Kα radiation; Bragg-Bentano geometry with Vantec 500 detector; angle range: 4° to 36° 2 Theta) of the as-produced borosilicate Rho zeolite and the calcined borosilicate Rho zeolite, respectively. The as-produced borosilicate Rho zeolite has a unit cell with an a parameter of 14.69 Å. The calcined borosilicate Rho zeolite has a unit cell with an a of 14.75 Å. Unlike other typical Rho zeolites, the borosilicate Rho zeolite of the present invention having a higher siliceous content shows little change in the unit cell upon removal of occluded species.

TABLE 5

| @2-Theta | d(Å) | Normalized Intensity |
| --- | --- | --- |
| 8.59 | 10.29 | 28.2 |
| 12.12 | 7.30 | 9.4 |
| 14.84 | 5.97 | 100 |
| 17.14 | 5.17 | 30.5 |
| 19.17 | 4.63 | 12.3 |
| 21.01 | 4.23 | 7.6 |
| 22.71 | 3.91 | 27.7 |
| 24.29 | 3.66 | 14.1 |
| 25.78 | 3.45 | 33.6 |
| 27.2 | 3.28 | 29.5 |
| 28.63 | 3.12 | 0.7 |
| 29.84 | 2.99 | 9.9 |
| 31.09 | 2.87 | 21.6 |
| 33.45 | 2.68 | 17.1 |
| 34.58 | 2.59 | 0.9 |
| 35.67 | 2.52 | 0.7 |
| 36.74 | 2.44 | 10.3 |
| 37.78 | 2.38 | 0.6 |
| 38.8 | 2.32 | 1.6 |
| 39.79 | 2.26 | 0.8 |
| 40.75 | 2.21 | 0.6 |
| 41.73 | 2.16 | 1.5 |
| 42.66 | 2.12 | 0.3 |
| 43.59 | 2.07 | 3.3 |
| 44.5 | 2.03 | 0.4 |
| 45.39 | 2.00 | 6.8 |

TABLE 6

| @2-Theta | d(Å) | Normalized Intensity |
| --- | --- | --- |
| 8.56 | 10.33 | 100.0 |
| 12.08 | 7.32 | 12.1 |
| 14.78 | 5.99 | 49.1 |
| 17.07 | 5.19 | 9.8 |
| 19.09 | 4.64 | 10.1 |
| 20.92 | 4.24 | 0.7 |
| 22.61 | 3.93 | 5.4 |
| 24.19 | 3.68 | 6.2 |
| 25.68 | 3.47 | 14.9 |
| 27.09 | 3.29 | 15.2 |
| 29.72 | 3.00 | 5.3 |
| 30.96 | 2.89 | 9.8 |
| 33.31 | 2.69 | 7.4 |
| 34.43 | 2.60 | 1.0 |
| 35.52 | 2.53 | 0.2 |
| 36.58 | 2.45 | 6.2 |
| 37.64 | 2.39 | 0.2 |
| 38.64 | 2.33 | 0.5 |
| 39.65 | 2.27 | 0.1 |
| 40.61 | 2.22 | 0.3 |
| 41.55 | 2.17 | 1.0 |
| 43.41 | 2.08 | 1.6 |
| 44.28 | 2.04 | 0.1 |
| 45.19 | 2.00 | 3.3 |

Example 5. Example 3 synthesis was repeated in a 23 mL Parr bomb. Thermogravimetric analysis (TGA) in air was performed on the as-produced borosilicate Rho zeolite. There was a 23.7 wt % cumulative mass loss up to 800° C., which illustrates the SDA and water being removed.

The Example 5 product was calcined as described in Example 4. This product was allowed to sit in open air overnight subsequent to the calcination. TGA in air was performed on the calcined borosilicate Rho zeolite. There was a less than 6 wt % cumulative mass loss up to 400° C., which is a high enough temperature to remove adsorbed water. The low wt % loss observed indicates that little water is adsorbed to the calcined borosilicate Rho zeolite and that the calcined borosilicate Rho zeolite is less hydrophilic than typical Rho zeolites having a comparatively low siliceous content.

Using BET analysis of nitrogen absorption data, surface area and micropore volume of the calcined borosilicate Rho zeolite were 993 m$^2$/g and 0.37 cm$^3$/g, respectively.

Figure 4A:
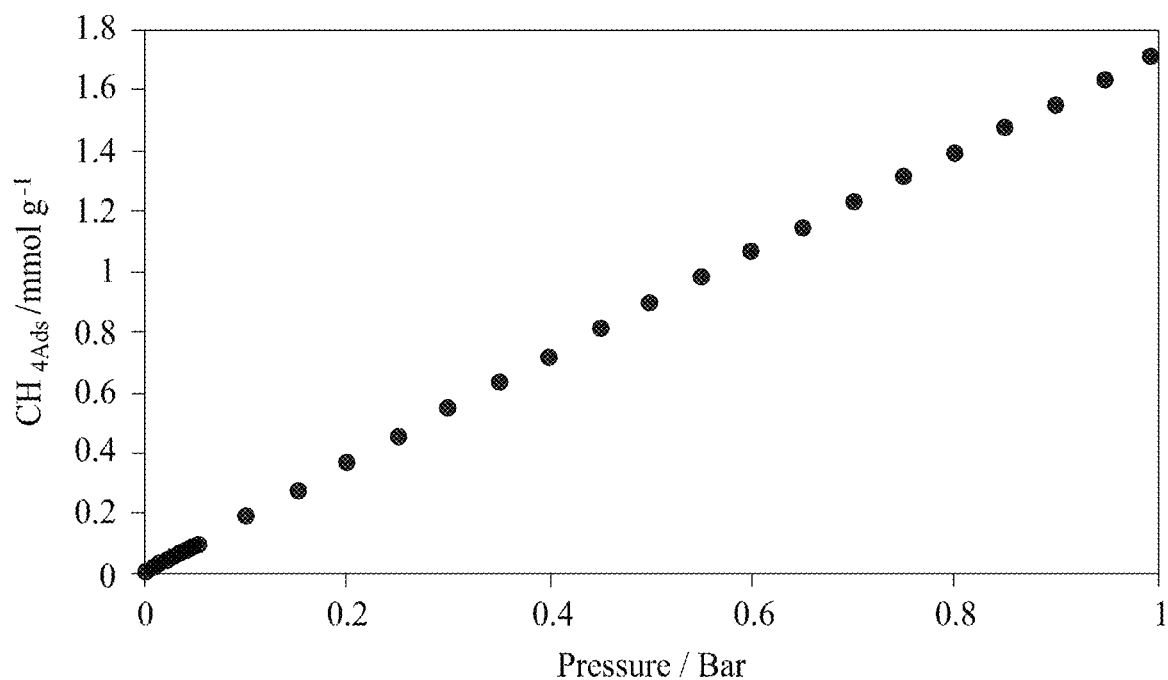
FIGS. 4A and 4B are methane isotherms at −15° C. at two different pressure ranges for a borosilicate Rho zeolite of the present invention
Figure 4B:
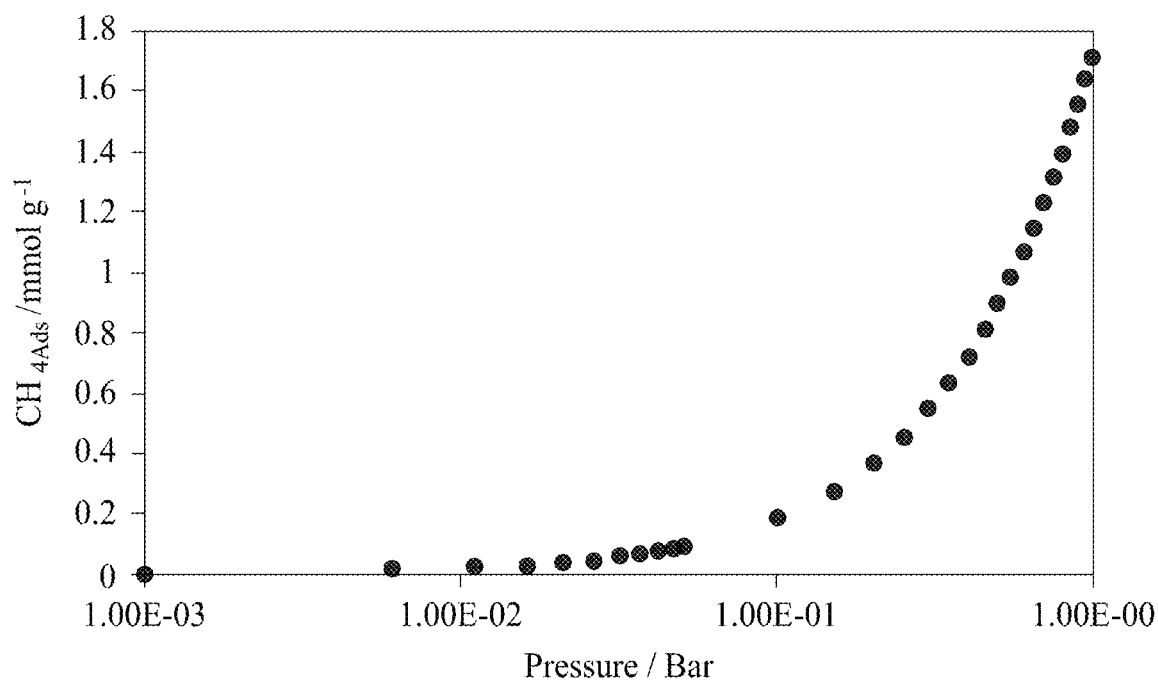

Methane isotherms at −15° C. were run at two different pressure ranges. The absorption isotherms are provided in FIGS. 4A and 4B.

Figure 5:
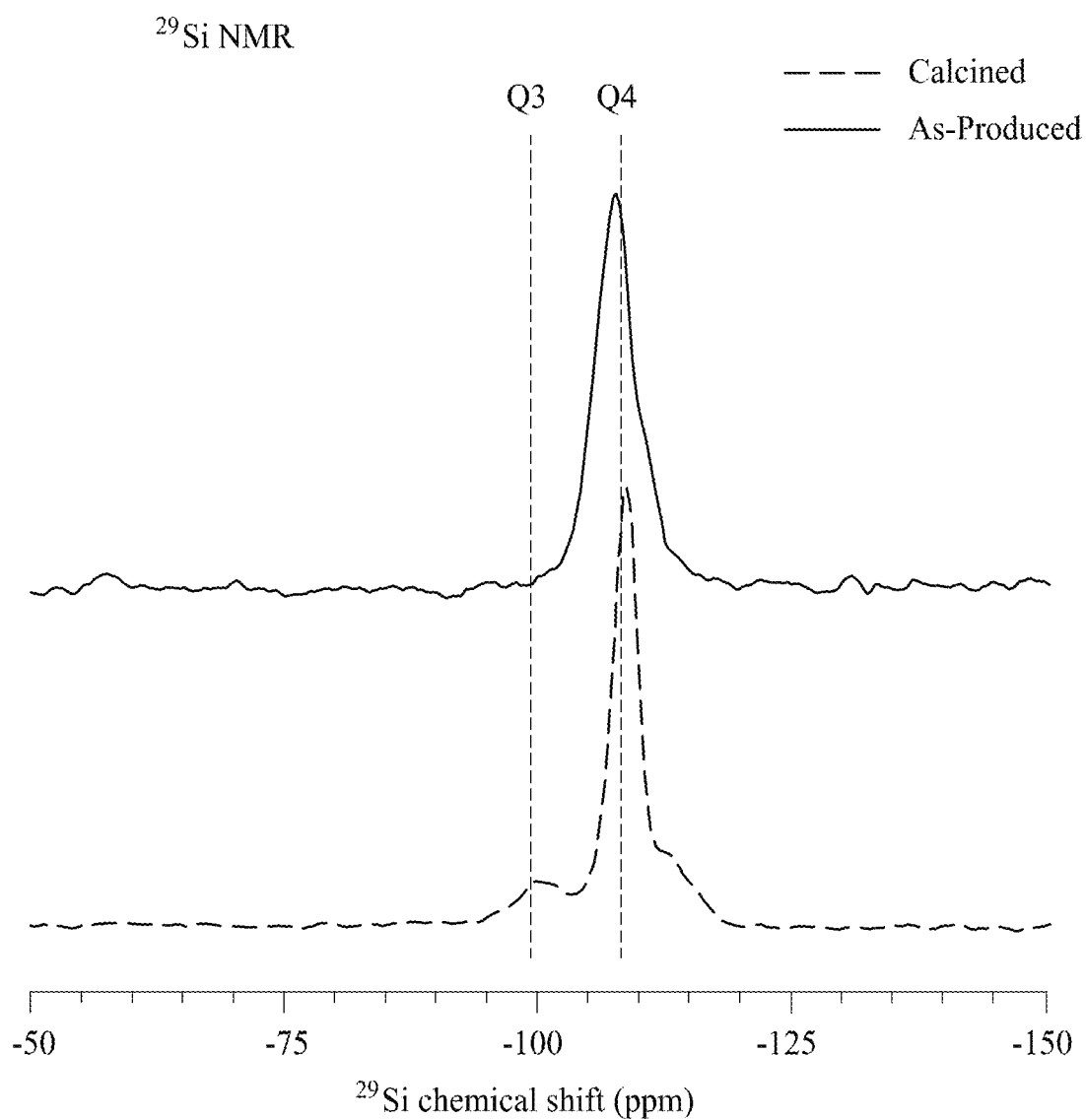
FIG. 5 is an overlay of the normalized 29Si NMR spectra of the as-produced and calcined borosilicate Rho zeolites of the present invention.

FIG. 5 is an overlay of the normalized $^{29}$Si NMR spectra of the as-produced and calcined borosilicate Rho zeolites. The as-produced borosilicate Rho zeolite has a pronounced shoulder around −112 ppm that may be due to silicon sites that are bonded through oxygen to a boron (Si—O—B). After calcination, the pattern becomes more complex, with a broader feature between −112 and 120 and a new feature at −100 ppm. The latter corresponds to Q3 silicon species that form upon the breakage of Si—O—B bonds. The broad shoulder is probably due to silicon species that remain bonded to boron.

Figure 6:
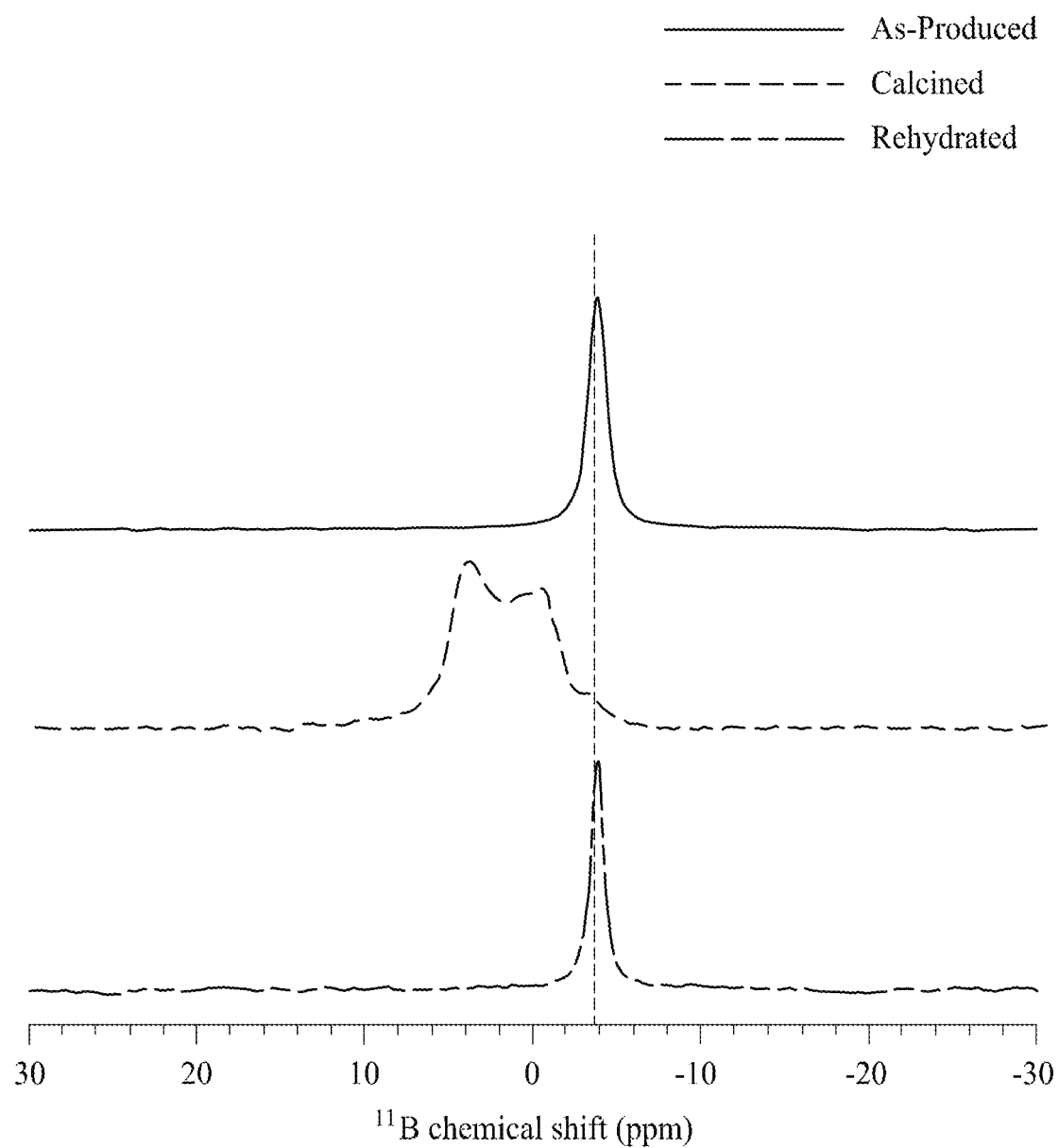
FIG. 6 is an overlay of the normalized 11B NMR spectra of the as-produced, calcined, and calcined/rehydrated borosilicate Rho zeolites of the present invention.

The calcined borosilicate Rho zeolite was rehydrated for 24 hours in a dessicator over saturated ammonium chloride to produce calcined/rehydrated borosilicate Rho zeolite. FIG. 6 is an overlay of the normalized $^{11}$B NMR spectra of the as-produced, calcined, and calcined/rehydrated borosilicate Rho zeolites. In the as-produced borosilicate Rho zeolite, all of the boron is tetrahedral as shown by the sharp resonance at around −4 ppm. In the calcined borosilicate Rho zeolite, most of the boron becomes trigonal (peak broadening and shirt to higher ppm) with only a small proportion being tetrahedral. The boron coordination in the calcined/rehydrated borosilicate Rho zeolite reverts back to tetrahedral.

Figure 7A:
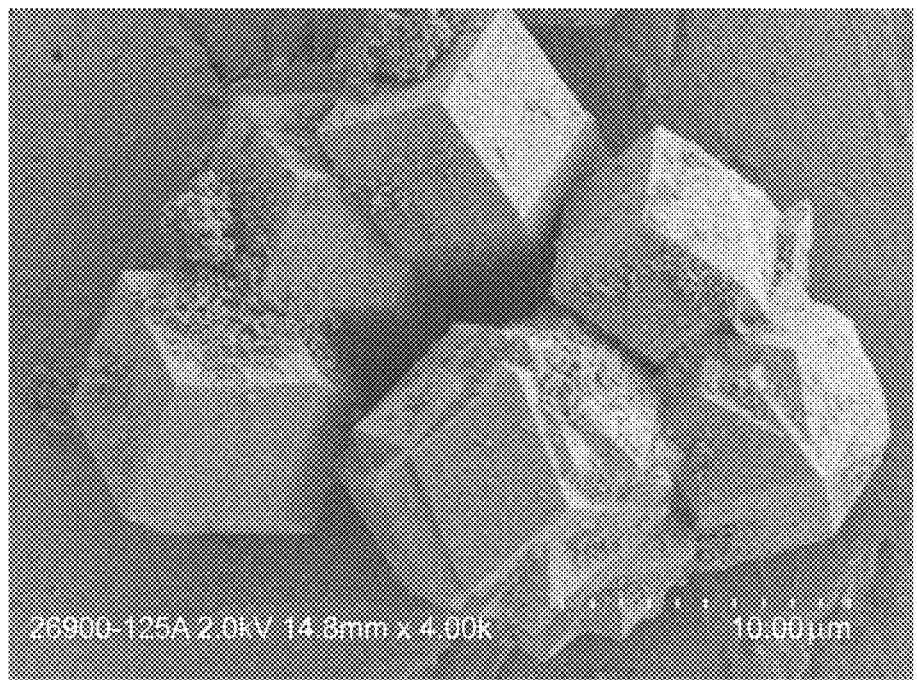
FIGS. 7A and 7B are SEM micrographs of a borosilicate Rho zeolite of the present invention.
Figure 7B:
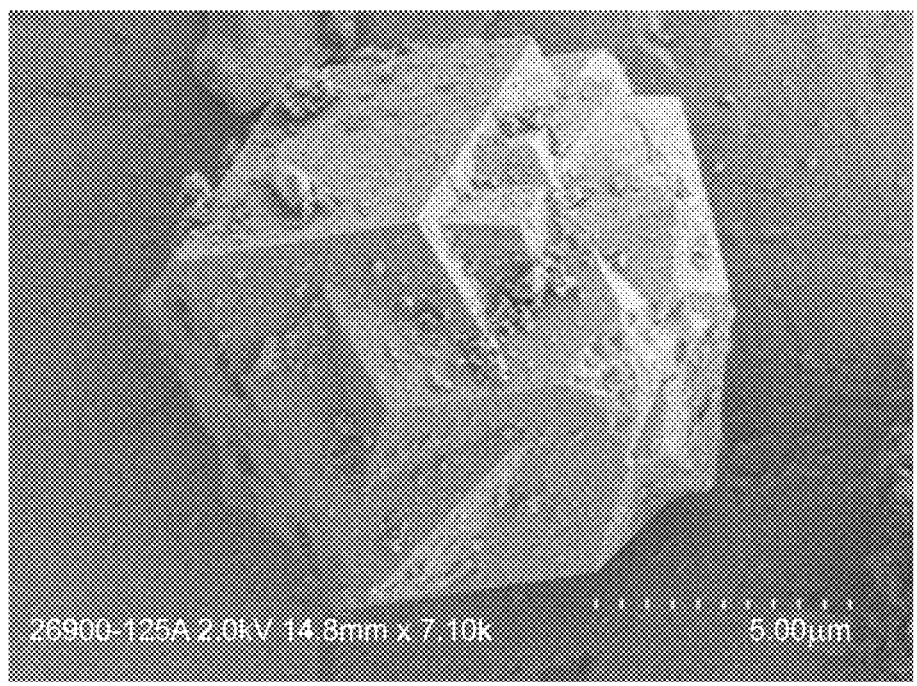

Example 6. Example 5 (seeded synthesis) was repeated with ULTRASIL™ as the silica source and only 10 days of reaction time. The produced borosilicate Rho zeolite had only trace amounts of the amorphous product (less than 1 wt % amorphous product). FIGS. 7A and 7B are SEM micrographs of the product.

Figure 8:
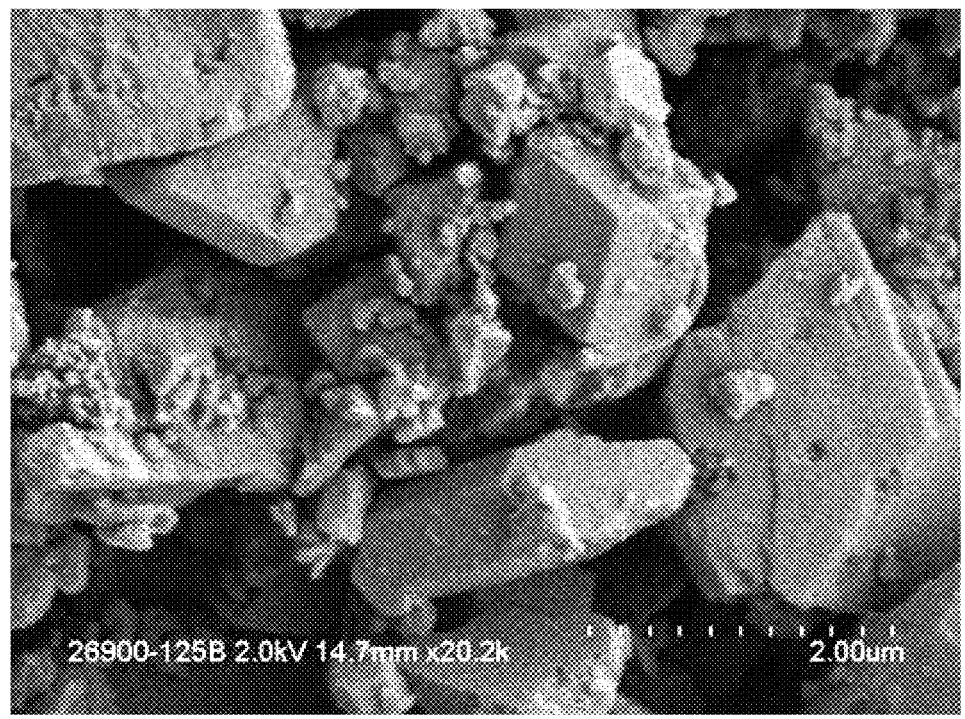
FIG. 8 is an SEM micrograph of a borosilicate Rho zeolite of the present invention.

Example 7. Example 5 (seeded synthesis) was repeated with LUDOX™ LX-30 (available from du Pont) as the silica source and only 10 days of reaction time. The produced borosilicate Rho zeolite was pure Rho (less than 0.1 wt % amorphous product). FIG. 8 is an SEM micrograph of the product.

Figure 9A:
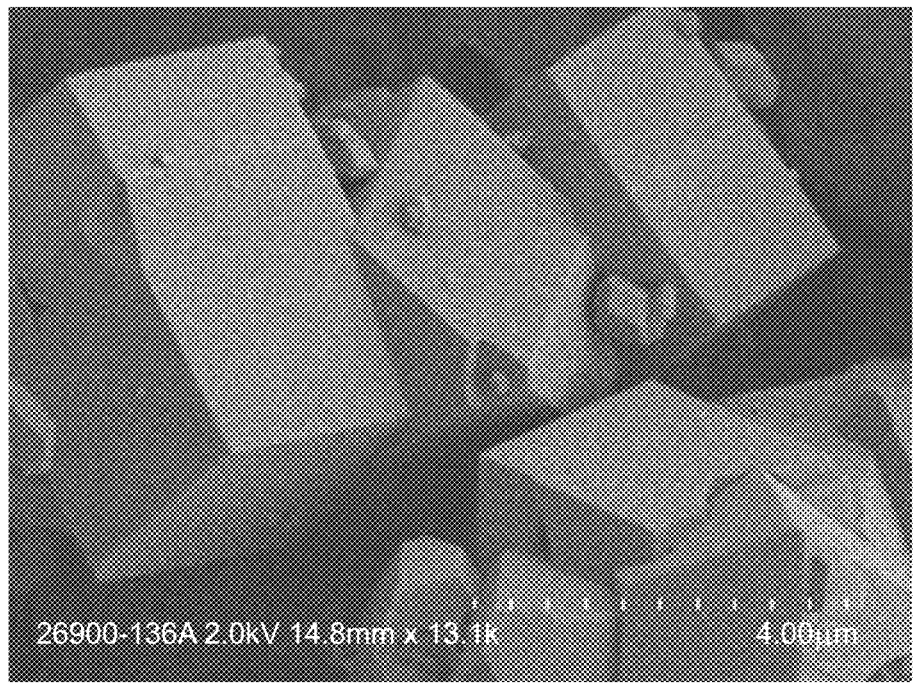
FIGS. 9A and 9B are SEM micrographs of a borosilicate Rho zeolite of the present invention.
Figure 9B:
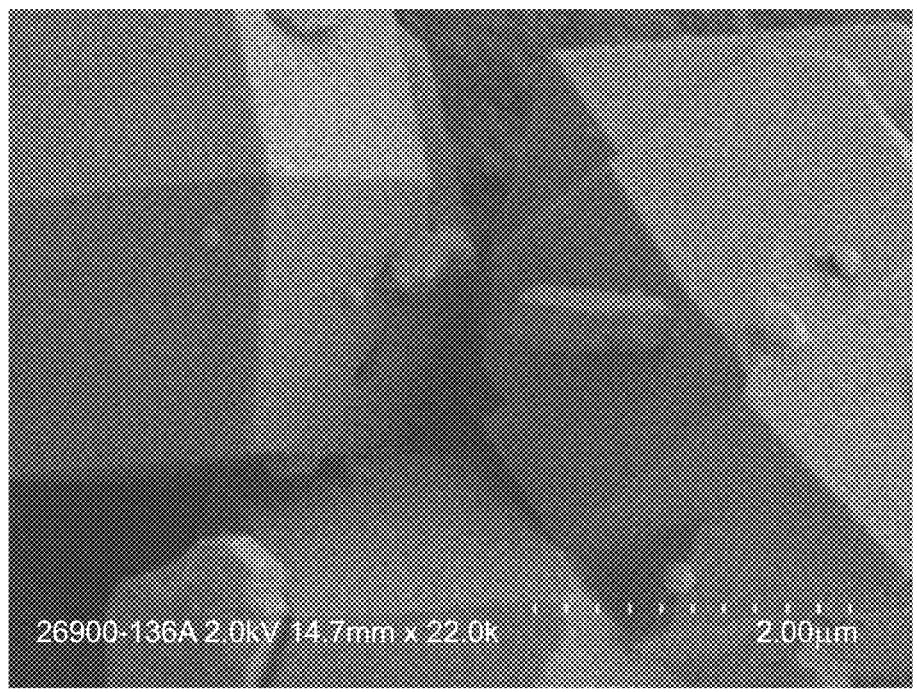

Example 8. Example 4 (seeded synthesis) was repeated with TMOS as the silica source, with a molar ratio of water to atomic Si in the reaction mixture of 7, and only 7 days of reaction time. The produced borosilicate Rho zeolite was pure Rho. FIGS. 9A and 9B are SEM micrographs of the product.

Example 9. Several aluminosilicate Rho zeolites and borosilicate Rho zeolites were prepared according to the reaction mixture components, reaction conditions, and product description provided in Table 7. The boron source was 3.47 wt % boric acid in water. The potassium source was 17.54 wt % KOH in water. The sodium source was 2 wt % to 10 wt % NaOH in water. The SDA was Compound I.

TABLE 7

| | Sample No. | | | | | |
|---|---|---|---|---|---|---|
| | 9-1 | 9-2 | 9-3 | 9-4 | 9-5 | 9-6 |
| Silica Source* | L | A | A | L | L | L |
| Si:Al (atomic) | 10** | 40** | 40** | — | — | 10*** |
| Si:B (atomic) | — | — | — | 5 | 10 | — |
| OH:Si (atomic) | 0.60 | 1.00 | 1.30 | 0.40 | 0.30 | 0.60 |
| SDA:Si (atomic) | 0.15 | 0.15 | 0.15 | 0.15 | 0.10 | 0.15 |
| $H_2O$:Si (atomic) | 44.00 | 49.00 | 57.00 | 53.00 | 35.00 | 37.00 |
| K:Si (atomic) | 0.15 | 0 | 0 | 0 | 0.10 | 0.00 |
| Na:Si (atomic) | 0.15 | 0.70 | 1 | 0.10 | 0 | 0.30 |
| HCl:Si (atomic) | 0.30 | 0.25 | 0.55 | 0 | 0 | 0 |
| Reaction Temp. (° C.) | 160 | 160 | 160 | 160 | 160 | 160 |
| Reaction Time (days) | 4 | 4 | 4 | 14 | 14 | 7 |
| Results | Al-RHO and impurities | pure Al-RHO | Al-RHO and impurities | pure B-RHO | B-RHO and impurities | Al-RHO and impurities |

*L is LUDOX™ LX-30 (30 wt % $SiO_2$); A is AERODISP W7330N (30 wt % $SiO_2$).
**The aluminum source was USALCO LSA (8.86 wt % in water).
***The aluminum source was kaolin.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A composition comprising:
   a Rho zeolite with a RHO topology having a Si to B ratio greater than or equal to 8 wherein the Rho zeolite has a BET surface area about 950 $m^2$/g to about 1100 $m^2$/g, a micropore volume of about 0.25 $cm^3$/g to about 0.50 $cm^3$/g, and an average diameter of 0.1 microns to 25 microns.

2. The composition of claim 1, wherein the Rho zeolite is produced in the presence of $C_4$-$C_6$ N,2-dimethylbenzimidazole.

3. The composition of claim 1, wherein the composition has, in an as-synthesized form of a borosilicate Rho zeolite, an X-ray diffraction pattern including the d-spacings (d(Å)) and relative intensities of:

| d(Å) | Relative Intensity |
|---|---|
| 10.4-10.2 | 25-35 |
| 6.1-5.9 | 80-100 |

| d(Å) | Relative Intensity |
|---|---|
| 5.3-5.1 | 25-35 |
| 4.0-3.8 | 25-35 |
| 3.55-3.35 | 30-40 |
| 3.34-3.24 | 25-35 |
| 2.95-2.8 | 15-25 |
| 2.75-2.6 | 15-25. |

4. The composition of claim 1, wherein the composition has, in a calcined or acid treated form of a borosilicate Rho zeolite, an X-ray diffraction pattern including the d-spacings (d(Å)) and relative intensities of:

| d(Å) | Relative Intensity |
|---|---|
| 10.4-10.2 | 80-100 |
| 7.4-7.2 | 10-20 |
| 6.1-5.9 | 40-60 |
| 4.7-4.4 | 5-15 |
| 3.6-3.4 | 10-20 |
| 3.35-3.2 | 10-20. |

5. The method of claim 1, wherein a Si source in the aqueous reaction mixture is selected from the group consisting of: a colloidal suspensions of silica, a precipitated silica alkali metal silicate, tetraalkyl orthosilicate, a different high silica zeolite and any combination thereof.

6. A process for separation of carbon dioxide from a mixture comprising carbon dioxide and one or more of an alkane, oxygen, nitrogen, $H_2S$, $SO_x$, and $NO_x$, the process comprising contacting the mixture with the composition of claim 1.

7. The process of claim 6, further comprising:
exposing the Rho zeolite to an acid.

8. A process for separation of carbon dioxide from a mixture comprising carbon dioxide and methane, the process contacting the mixture with the composition of claim 1.

9. A process comprising contacting a gas stream comprising $NO_x$ and the composition of claim 1 impregnated with a metal, wherein the metal is one transition metal selected from copper, zinc, vanadium, chromium, manganese, iron, cobalt, nickel, rhodium, palladium, platinum, molybdenum, titanium and zirconium, alkali or alkaline earth metals; or rare earth.

10. A process comprising synthesizing a methylamine from methanol and/or dimethylether and ammonia using the composition of claim 1 as a catalyst.

11. A method comprising:
heating an aqueous reaction mixture having a molar ratio of atomic Si to atomic B of about 4 to about 50 or a molar ratio of atomic Si to atomic Al of about 4 to about 50 in the presence of a structure directing agent of Compound I, Compound II, Compound III, or a mixture of two or more of Compounds I, II, and III to a temperature of at least 75° C. to produce a Rho zeolite;

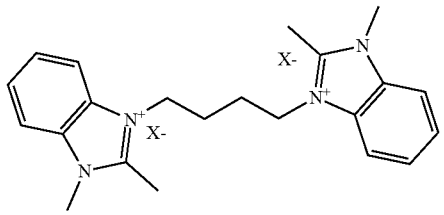

Compound I

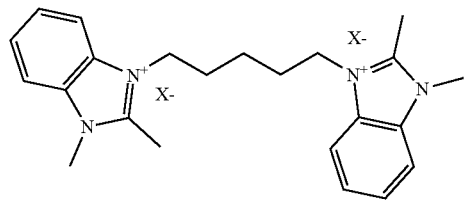

Compound II

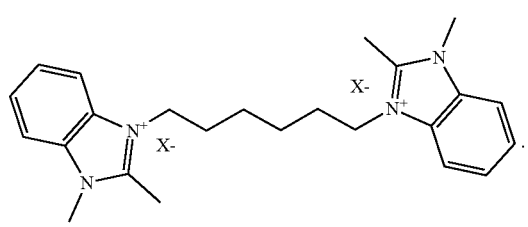

Compound III

12. The method of claim 11, wherein the aqueous reaction mixture has a molar ratio of atomic Si to the structure directing agent of about 1 to about 15.

13. The method of claim 11, wherein the aqueous reaction mixture has a molar ratio of water to atomic Si of about 2 to about 50.

14. The method of claim 11, wherein a B source in the aqueous reaction mixture is selected from the group consisting of: boric acid, a water-soluble boric acid salt, and any combination thereof.

15. The method of claim 11, wherein an Al source in the aqueous reaction mixture is selected from the group consisting of: aluminum nitrate, aluminum sulfate, sodium aluminate, aluminum oxide, alumina sol, alumina trihydrate, and any combination thereof.

16. The method of claim 15, wherein a calcined borosilicate Rho zeolite has an X-ray diffraction pattern including the d-spacings (d(Å)) and relative intensities of:

| d(Å) | Relative Intensity |
|---|---|
| 10.4-10.2 | 80-100 |
| 7.4-7.2 | 10-20 |
| 6.1-5.9 | 40-60 |
| 4.7-4.4 | 5-15 |
| 3.6-3.4 | 10-20 |
| 3.35-3.2 | 10-20. |

17. The method of claim 15, wherein a calcined aluminosilicate Rho zeolite has an X-ray diffraction pattern including the d-spacings (d(Å)) and relative intensities of:

| d(Å) | Relative Intensity |
|---|---|
| 10.6-10.4 | 80-100 |
| 7.3-7.5 | 10-30 |

-continued

| d(Å) | Relative Intensity |
|---|---|
| 6.15-6.05 | 80-100 |
| 4.8-4.6 | 10-25 |
| 3.6-3.4 | 20-50 |
| 3.37-3.27 | 30-50. |

18. The method of claim 11, wherein the temperature is about 75° C. to about 200° C.

19. The method of claim 11, wherein heating occurs for 2 hours to 20 days.

20. The method of claim 11, wherein the aqueous reaction mixture further comprises Rho zeolite seeds.

21. The method of claim 11, wherein, in an as-synthesized form, a borosilicate Rho zeolite has an X-ray diffraction pattern including the d-spacings (d(Å)) and relative intensities of:

| d(Å) | Relative Intensity |
|---|---|
| 10.4-10.2 | 25-35 |
| 6.1-5.9 | 80-100 |
| 5.3-5.1 | 25-35 |
| 4.0-3.8 | 25-35 |
| 3.55-3.35 | 30-40 |
| 3.34-3.24 | 25-35 |

-continued

| d(Å) | Relative Intensity |
|---|---|
| 2.95-2.8 | 15-25 |
| 2.75-2.6 | 15-25. |

22. The method of claim 11, wherein, in an as-synthesized form, an aluminosilicate Rho zeolite has an X-ray diffraction pattern including the d-spacings (d(Å)) and relative intensities of:

| d(Å) | Relative Intensity |
|---|---|
| 10.8-10.5 | 25-35 |
| 6.2-6.0 | 80-100 |
| 5.4-5.2 | 25-35 |
| 4.1-3.9 | 25-35 |
| 3.55-3.45 | 30-40 |
| 3.36-3.32 | 25-35 |
| 3.08-3.00 | 15-25 |
| 2.74-2.70 | 15-25. |

23. The method of claim 11, further comprising:
calcining the Rho zeolite at 500° C. to 800° C. to produce a calcined Rho zeolite, and exposing the Rho zeolite to an acid to produce an acid treated Rho zeolite.

24. The process of claim 1, wherein the Rho zeolite has an average diameter of 3 microns to 10 microns.

* * * * *